US009137355B2

(12) United States Patent
Ramachandran

(10) Patent No.: US 9,137,355 B2
(45) Date of Patent: Sep. 15, 2015

(54) METHOD AND APPARATUS FOR ENABLING COLLABERATIVE INTERACTIONS AMONG DEVICES ON A PEER-TO-PEER NETWORK

(71) Applicant: QUALCOMM Incorporated, San Diego, CA (US)

(72) Inventor: Krishnan Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 13/732,431

(22) Filed: Jan. 1, 2013

(65) Prior Publication Data

US 2014/0187221 A1 Jul. 3, 2014

(51) Int. Cl.
*H04M 3/00* (2006.01)
*H04M 1/725* (2006.01)
*H04W 4/00* (2009.01)
*H04W 84/18* (2009.01)

(52) U.S. Cl.
CPC .......... *H04M 1/72597* (2013.01); *H04W 4/001* (2013.01); *H04W 4/008* (2013.01); *H04W 84/18* (2013.01)

(58) Field of Classification Search
CPC ....... H04Q 24/04; H04Q 48/04; H04Q 76/04; H04Q 88/02; H04W 4/001; H04W 4/008; H04W 4/005; H04W 8/005; H04W 8/18; H04W 8/22; H04W 4/12; H04W 4/14; H04W 84/005; H04W 84/02; H04W 84/18
USPC ............... 455/414.1, 418, 419, 420, 417, 466
See application file for complete search history.

(56) References Cited

U.S. PATENT DOCUMENTS

2004/0111478 A1* 6/2004 Gross et al. .................. 709/206
2005/0010386 A1* 1/2005 Tharp et al. .................... 703/13
2005/0198247 A1* 9/2005 Perry et al. .................. 709/223

(Continued)

FOREIGN PATENT DOCUMENTS

WO WO-2004040923 A1 5/2004

OTHER PUBLICATIONS

International Search Report and Written Opinion—PCT/US2013/076229—ISAEPO—Jul. 4, 2014.

*Primary Examiner* — Jean Gelin
(74) *Attorney, Agent, or Firm* — Shirin Tefagh; Joseph Agusta

(57) ABSTRACT

A method, an apparatus, and a computer program product for collaboratively communications among device are provided in which a communications device is operable to receive a message from a peer device in the communications environment which indicates that an event associated with the peer device has occurred. Further, based on reception of the message, the device may be operable to change at least one of functionality from a normal operating state to a modified operating state. Similarly, a device may be operable to receive a message indicating various functionalities active on a peer device. When the device detects occurrence of an event, it may determine whether any of the various functionalities associated with the peer device may be affected. Where any of the functionalities are affected, the device may generate a message for the peer device associated with the affected functionality and may transmit the message to the peer device.

57 Claims, 7 Drawing Sheets

(56) References Cited

U.S. PATENT DOCUMENTS

| | | |
|---|---|---|
| 2006/0252530 A1* | 11/2006 | Oberberger et al. ............ 463/29 |
| 2007/0243934 A1* | 10/2007 | Little et al. ..................... 463/40 |
| 2012/0220230 A1 | 8/2012 | Kurata et al. |
| 2012/0231770 A1* | 9/2012 | Clarke et al. ............... 455/414.1 |
| 2013/0078979 A1* | 3/2013 | Bell et al. ...................... 455/418 |
| 2013/0157574 A1 | 6/2013 | Craine |
| 2013/0244713 A1* | 9/2013 | Klein et al. ................... 455/521 |
| 2013/0252595 A1* | 9/2013 | Mairs et al. .................. 455/415 |

\* cited by examiner

METHOD AND APPARATUS FOR ENABLING COLLABERATIVE INTERACTIONS AMONG DEVICES ON A PEER-TO-PEER NETWORK

BACKGROUND

The present application relates generally to device communications, and more specifically to methods and systems for providing an improved user experience through enabling collaborative interactions among devices (e.g., terminal, client, etc.) on a peer-to-peer network.

Communication systems are widely deployed to provide various types of content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, time division synchronous code division multiple access (TD-SCDMA) systems and orthogonal frequency division multiple access (OFDMA) systems. Further these systems may be wireline based using coaxial cable, fiber optic cable, twisted pair, digital subscriber line (DSL), etc.

Generally, a user may be associated with and/or within a close proximity of multiple devices (e.g., smartphones, tablets, handheld gaming devices, etc.). Currently, applications within a device may collaborate. For example, if a user is watching a video on a device and there is an incoming call, the video may be paused, and user is able to take the incoming call. By contrast, such collaboration does not currently exist between connected devices for e.g., when a tablet and smartphones are connected in a peer-to-peer network. As such, when a user receives a phone call on a first device while watching a video on a second device, the user needs to explicitly/manually pause or stop the video content on the second device before taking the call on the first device. In another example, when different devices are in use on a network in which connectivity is shared (e.g., using WiFi router and mifi devices), playback of a streaming video on a second device and may reduce quality of voice over IP (VoIP) call on a first device. Conversely, if VoIP data is given a high priority than the video data, than the user experience associated with the streaming video playback may be diminished.

Therefore, a system and method that provides an improved user experience through enabling collaborative interactions among devices on a peer-to-peer network is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to related aspects, a method for providing an improved user experience through enabling collaborative interactions among devices is provided. The method can include receiving, by a first device, a first message from a second device. In an aspect, the first message may include at least one of information indicating an occurrence of an event associated with the second device, or information prompting the first device to modifying one or more functionalities based on the occurrence of the event. In another aspect, the first device and second device may be associated with a peer network. Moreover, the method may include changing at least one of the one or more functionalities from a normal operating state to a modified operating state.

Another aspect relates to a communications apparatus configured to provide an improved user experience through enabling collaborative interactions among devices. The communications apparatus can include means for receiving, by a first device, a first message from a second device. In an aspect, the first message may include at least one of information indicating an occurrence of an event associated with the second device, or information prompting the first device to modifying one or more functionalities based on the occurrence of the event. In another aspect, the first device and second device may be associated with a peer network. Moreover, the communications apparatus can include means for changing at least one of the one or more functionalities from a normal operating state to a modified operating state.

Another aspect relates to a communications apparatus. The apparatus can include a processing system configured to receive, by a first device, a first message from a second device. In an aspect, the first message may include at least one of information indicating an occurrence of an event associated with the second device, or information prompting the first device to modifying one or more functionalities based on the occurrence of the event. In another aspect, the first device and second device may be associated with a peer network. Moreover, the processing system may further be configured to change at least one of the one or more functionalities from a normal operating state to a modified operating state.

Still another aspect relates to a computer program product, which can have a computer-readable medium including at least one instruction for causing a computer to receive, by a first device, a first message from a second device. In an aspect, the first message may include at least one of information indicating an occurrence of an event associated with the second device, or information prompting the first device to modifying one or more functionalities based on the occurrence of the event. In another aspect, the first device and second device may be associated with a peer network. Moreover, the computer-readable medium can include at least one instruction for causing the computer to change at least one of the one or more functionalities from a normal operating state to a modified operating state.

According to related aspects, a method for provided an improved user experience through enabling collaborative interactions among devices is provided. The method can include receiving, by a first device, a first message from a second device. In an aspect, the first message may include information indicating one or more functionalities active on the second device. In another aspect, the first device and second device are associated with a peer network. Further, the method may include detecting an occurrence of an event associated with the first device. Further, the method may include determining, based on the first message, that an operating state of at least one of the one or more functionalities is to be modified based on the occurrence of the event. Further, the method may include generating a second message which includes at least one of information indicating an occurrence of an event associated with the first device, or information prompting the second device to change at least one of the one or more functionalities from a normal operating state to a modified operating state based on the occurrence of the event. Moreover, the method may include transmitting the second message to the second device.

Another aspect relates to a communications apparatus configured to provide an improved user experience through enabling collaborative interactions among devices. The communications apparatus can include means for receiving, by a first device, a first message from a second device. In an aspect, the first message may include information indicating one or more functionalities active on the second device. In another aspect, the first device and second device are associated with a peer network. Further, the communications apparatus can include means for detecting an occurrence of an event associated with the first device. Further, the communications apparatus can include means for determining, based on the first message, that an operating state of at least one of the one or more functionalities is to be modified based on the occurrence of the event. Further, the communications apparatus can include means for generating a second message which includes at least one of information indicating an occurrence of an event associated with the first device, or information prompting the second device to change at least one of the one or more functionalities from a normal operating state to a modified operating state based on the occurrence of the event. Moreover, the communications apparatus can include means for transmitting the second message to the second device.

Another aspect relates to a communications apparatus. The apparatus can include a processing system configured to receive, by a first device, a first message from a second device. In an aspect, the first message may include information indicating one or more functionalities active on the second device. In another aspect, the first device and second device are associated with a peer network. Further, the processing system may further be configured to detect an occurrence of an event associated with the first device. Further, the processing system may further be configured to determine, based on the first message, that an operating state of at least one of the one or more functionalities is to be modified based on the occurrence of the event. Further, the processing system may further be configured to generate a second message which includes at least one of information indicating an occurrence of an event associated with the first device, or information prompting the second device to change at least one of the one or more functionalities from a normal operating state to a modified operating state based on the occurrence of the event. Moreover, the processing system may further be configured to transmit the second message to the second device.

Still another aspect relates to a computer program product, which can have a computer-readable medium including at least one instruction for causing a computer to receive, by a first device, a first message from a second device. In an aspect, the first message may include information indicating one or more functionalities active on the second device. In another aspect, the first device and second device are associated with a peer network. Further, the computer-readable medium can include at least one instruction for causing the computer to detect an occurrence of an event associated with the first device. Further, the computer-readable medium can include at least one instruction for causing the computer to determine, based on the first message, that an operating state of at least one of the one or more functionalities is to be modified based on the occurrence of the event. Further, the computer-readable medium can include at least one instruction for causing the computer to generate a second message which includes at least one of information indicating an occurrence of an event associated with the first device, or information prompting the second device to change at least one of the one or more functionalities from a normal operating state to a modified operating state based on the occurrence of the event. Moreover, the computer-readable medium can include at least one instruction for causing the computer to transmit the second message to the second device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

A "user" disclosed herein may be construed broadly to include any entity interacting with, contributing information to, and/or obtaining information from a device.

A "functionality" disclosed herein may include any feature associated with the device through which the user may interact with the device. Examples of functionalities include, but are not limited to, an application associated with the device, a sensor associated with the device, hardware associated with the device, etc., or any combination thereof.

An "event" disclosed herein may include any activity that may change an operational mode of a functionality on a device. Examples of events include, but are not limited to, an indication that one or more functionalities associated with the a connected device are now currently active on the connected device, reception of a call, reception of a notification, reception of a request, reception of a bandwidth intensive activity, initiation of a call, initiation of a notification, initiation of a bandwidth intensive activity, initiation of a request, etc.

According to one or more aspects, a communications environment may be provided including multiple devices that are configured to collaboratively interact. A device may receive a message from a peer device in the communications environment which indicates that an event associated with the peer device has occurred. Further, based on reception of the message, the device may change at least one of functionality from a normal operating state to a modified operating state. Similarly, a device may receive a message indicating various functionalities active on a peer device. When the device detects occurrence of an event, it may determine whether any of the various functionalities associated with the peer device may be affected. Where any of the functionalities are affected, the device may generate a message for the peer device associated with the affected functionality and may transmit the message to the peer device.

Figure 1:
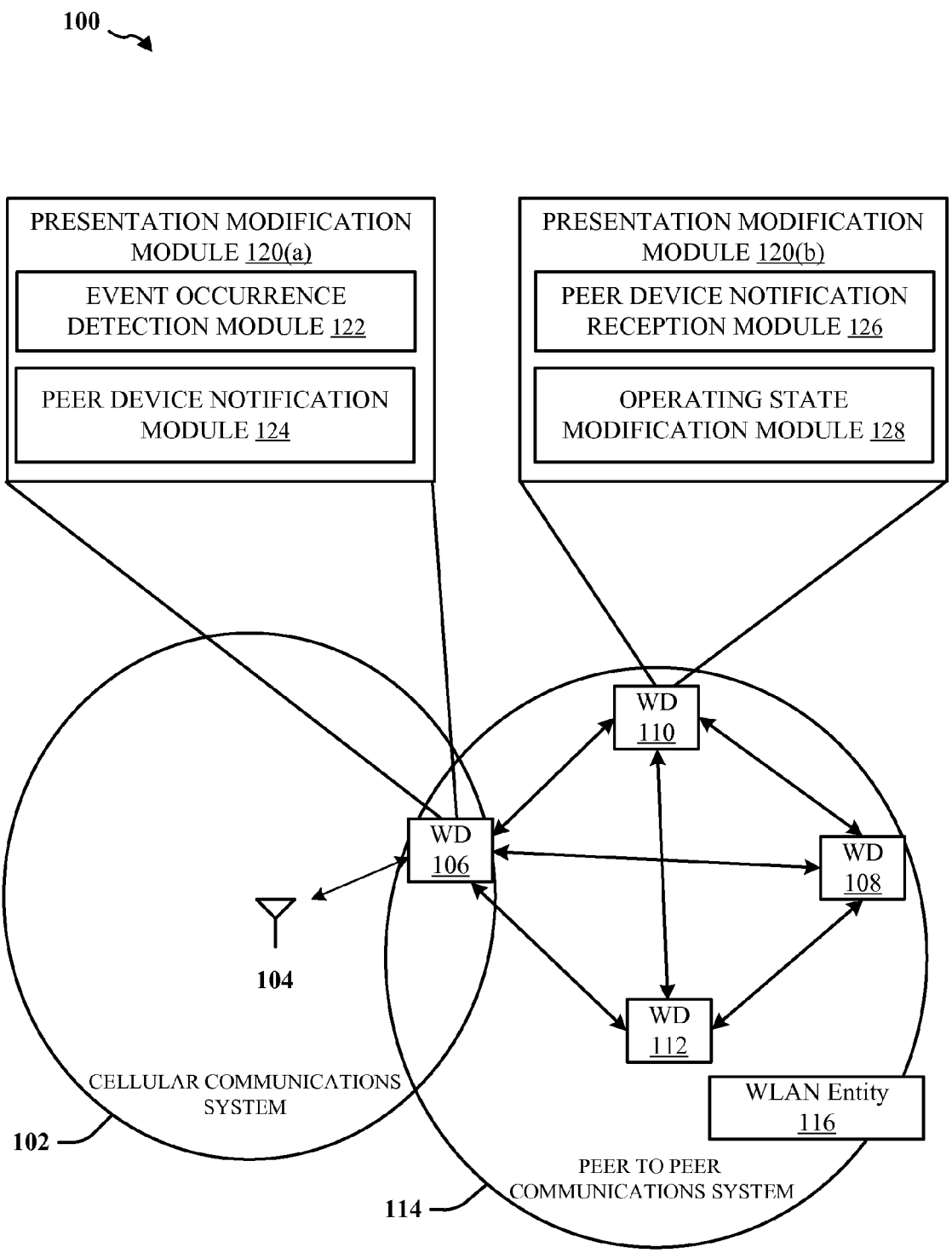
FIG. 1 depicts a block diagram of a communications system in which multiple device may collaboratively interact, according to an aspect.

FIG. 1 is a drawing of an example communications system 100. The communications system 100 includes a plurality of wireless devices 106, 108, 110, 112. The communications system 100 may include a cellular communications system 102, such as for example, a wireless wide area network (WWAN), and a peer-to-peer communication system 114, such as for example, a wireless local area network (WLAN). In an aspect, cellular communications system 102 may be configured to use various systems, such as but not limited to, code division multiple access (CDMA) systems, time division multiple access (TDMA) systems, frequency division multiple access (FDMA) systems, 3GPP Long Term Evolution (LTE) systems, time division synchronous code division multiple access (TD-SCDMA) systems, orthogonal frequency division multiple access (OFDMA) systems, Global System for Mobile Communications (GSM) systems, Universal Terrestrial Radio Access (UTRA) systems, Evolved UTRA (E-UTRA) systems, etc. Some of the wireless devices 106, 108, 110, 112 may communicate together in peer-to-peer communication, some may communicate with the base station 104, and some may do both. For example, as shown in FIG. 1, the wireless devices 106, 108, 110, 112 are in peer-to-peer communication. In an aspect, the peer-to-peer communications may be performed through direct communications between wireless devices 106, 108, 110, 112. In an aspect, the peer-to-peer communications may be facilitated through a WLAN entity 116 (e.g., WiFi router). In another aspect, wireless devices 106, 108, 110, 112 may be operable to communicate using wired communications such as systems based on coaxial cable, fiber optic cable, twisted pair, digital subscriber line (DSL), etc. The wireless device 106 may also communicate with the base station 104.

Further the wireless devices (e.g., 106, 110) may include a presentation modification module 120 (e.g., 120(a), 120(b)) that may be configured to allow multiple devices to collaboratively interact when occurrence of an event is detected. In an aspect, wireless device 106 presentation modification module 120(a) may include an event occurrence detection module 122 and a peer device notification module 124. In another aspect, wireless device 110 presentation modification module 120(b) may include peer device notification reception module 126 and operating state modification module 128. Although FIG. 1 depicts various modules (122, 124, 126, 128) being present in different presentation modification modules 120 (e.g., 120(a), 120(b)), one of ordinary skill in the art would appreciate each any combination of modules (122, 124, 126, 128) may be included in presentation modification modules 120 and may be associated with any of the wireless devices 106, 108, 110, 112. Event occurrence detection module 122 may be configured to detect an event occurrence associated with wireless device 106. In an aspect, the occurrence of the event may include reception and/or initiation of a functionality, a call, a notification, a request, a bandwidth intensive activity, etc., or any combination thereof. For example, wireless device 106 may receive a call through base station 104. In another aspect, wireless device 106 may attempt to download content that uses a large portion of bandwidth available through WLAN entity 116. Peer device notification module 124 may be configured to determine whether any other devices (e.g., 108, 110, 112) and/or functionalities active on any of the other devices (e.g., 108, 110, 112) may be affected by occurrence of the event associated with wireless device 106. Further, Peer device notification module 124 may communicate a message based on the vent occurrence to any potentially affected wireless devices (e.g., 108, 110, 112). Peer device notification reception module 126 may be configured to receive messages indicating occurrence and/or completion of an event associated with another device (e.g., 106). Operating state modification module 128 may be configured to modify presentation, usage, display, etc., of one or more functionalities associated with the wireless device 110 based on reception of the message indicating the event occurrence and/or completion. In an aspect, operating state modification module 128 may be configured to switch between a modified operational mode and a normal operational mode based at least in part on whether an event has occurred and/or the event occurrence has completed.

In an operational aspect, a user and/or a group of users may connect multiple devices (e.g., 106, 108, 110, 112,) using peer-to-peer communication system 114 (e.g., a peer network configured to use alljoyn based messages). After connection, the devices periodically listen for information indicating what functionalities are active on other devices in the peer-to-peer communications system 114. In an aspect, wireless device 110 may send a message about its currently running functionalities (e.g., applications, components, etc.) to wireless device 106. For example, when the user starts streaming video on wireless device 110, wireless device 110 may send a message to wireless device 106. When an incoming call is detected by wireless device 106, wireless device 106 may send a message to wireless device 110. In another aspect, the event may be an incoming SMS, notification, etc. In an aspect, the message may prompt wireless device 110 to pause playback of content on wireless device 110. Upon reception of the message, wireless device 110 may pause the video playback. At the end of the call, wireless device 106 may send a message prompt wireless device 110 to resume video playback, and upon receipt of the message, wireless device 110 may resume the video. In an aspect, during the pausing of the video, the wireless device 110 may further turn off and/or dim a display. For example, when wireless device 110 is a tablet, e-reader, etc., and there is an incoming phone call of wireless device 106, the message sent by wireless device 106 may also prompt the tablet/e-reader to switch off a backlight or a display screen so as to save power on wireless device 110 while the user is taking the phone call on wireless device 106.

In another operational aspect, an improved user experience may be achieved where the wireless devices (106, 108, 110, 112) are operating under low bandwidth conditions with a common internet back-end (e.g., WLAN entity 116). For example, where two devices are using a WiFi hotspot created by another device and/or WLAN entity 116. One device (e.g., 106) may be providing a streaming video, and the second device (e.g., 110) may be performing a location search, sending an urgent email, etc. In an aspect, wireless device 110 may send a message to wireless device 106 to prompt wireless device 106 to pause the video playback. Further, wireless device 110 may send a message to wireless device 106 prompting wireless device 106 to restart the video playback once the location request or email message transmission is completed.

In another operational aspect, a voice augmented GPS application active on wireless device 110 may be muted upon reception of a message from wireless device 106 indicating an incoming call. Normal operation of the application may resume once the call is completed.

In another operational aspect, a user and/or a group of users may connect multiple devices (e.g., 106, 108, 110, 112,) using peer-to-peer communications system 114 (e.g., a peer network configured to use alljoyn based messages). After connection, the devices periodically listen for information indicating what functionalities are active on other devices in the peer-to-peer communications system 114. In an aspect, wireless device 110 may send a message about its currently running functionalities (e.g., applications, components, etc.) to wireless device 106. For example, when the user starts streaming video on wireless device 110, wireless device 110 may send a message to wireless device 106. Thereafter, when, for example, a user starts to use wireless device 106, then wireless device 106 may send a message indicating that it is now actively running functionalities (e.g., applications, components, etc.) to wireless device 110. In response to the message from wireless device 106, wireless device 110 may pause any currently running functionalities. In an optional aspect, when the user ceases interactions with wireless device 106, then wireless device 106 may send another message indicating that the functional is not longer active. Such a message may prompt wireless device 110 to resume running of the paused functionalities.

As such, the user does not have to explicitly pause or close the playing of content on wireless device 110 when an event occurs on wireless device 106. Further, where the audio playback is loud on wireless device 110 and/or the user is using a headset, automatically pausing playback based on reception of the message may improve user experience.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The example methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 2:
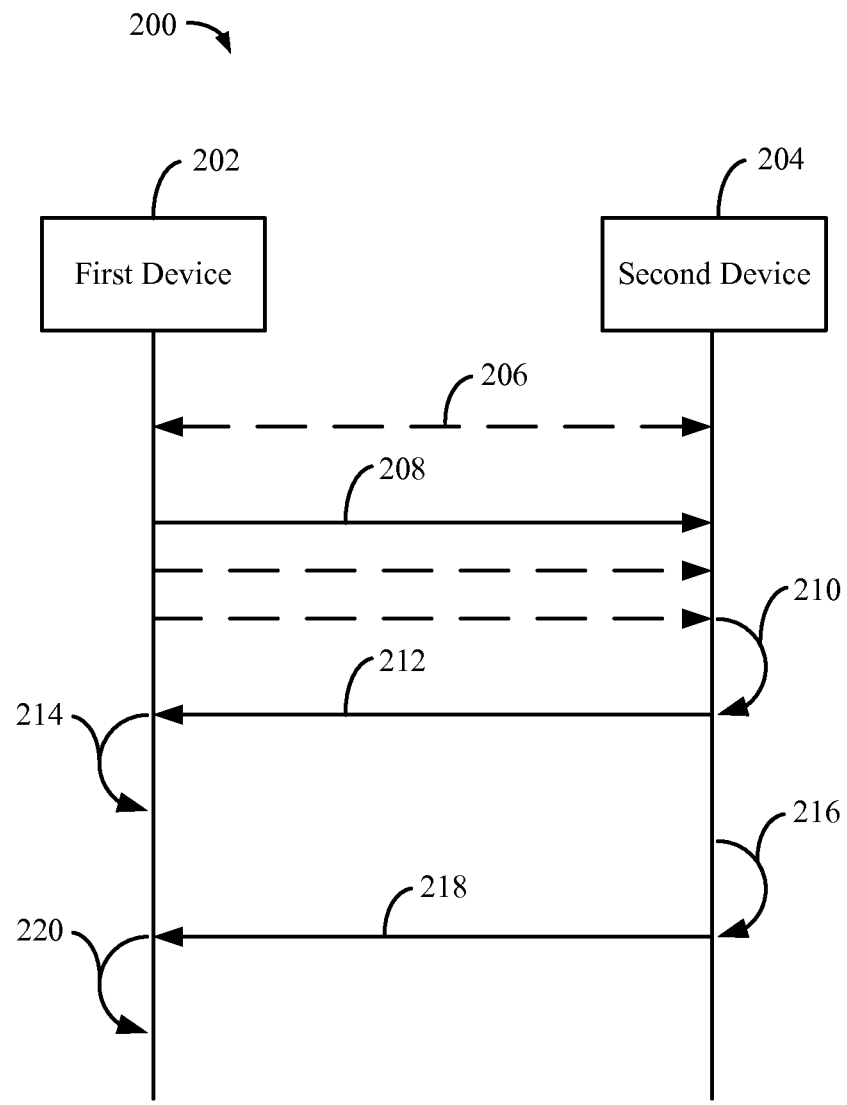
FIG. 2 depicts a call flow diagram conceptually illustrating communications within a communications system in which multiple device may collaboratively interact, according to an aspect.
Figure 3:
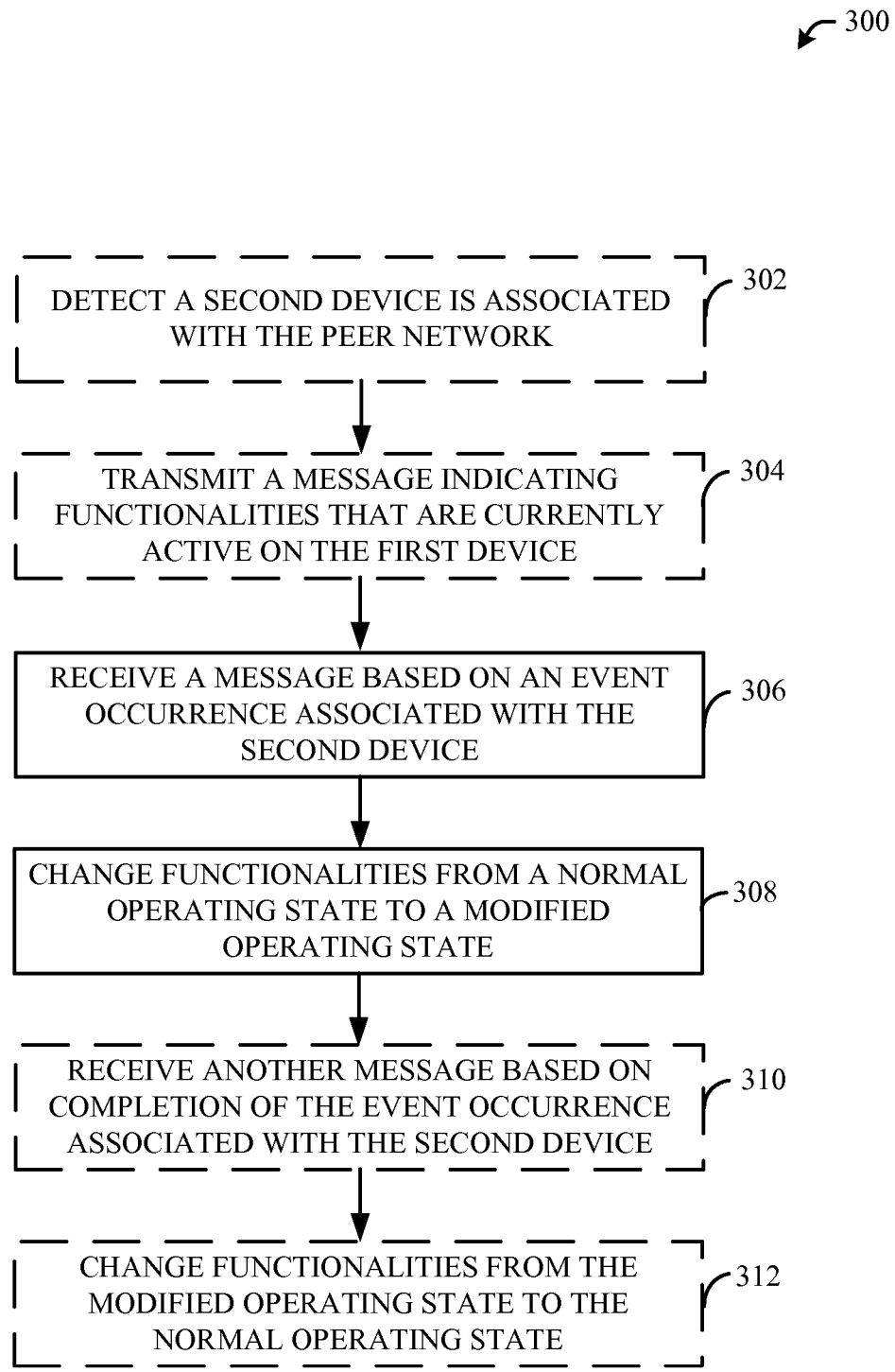
FIG. 3 depicts a flowchart describing an example system in which multiple device may collaboratively interact, according to an aspect.
Figure 4:
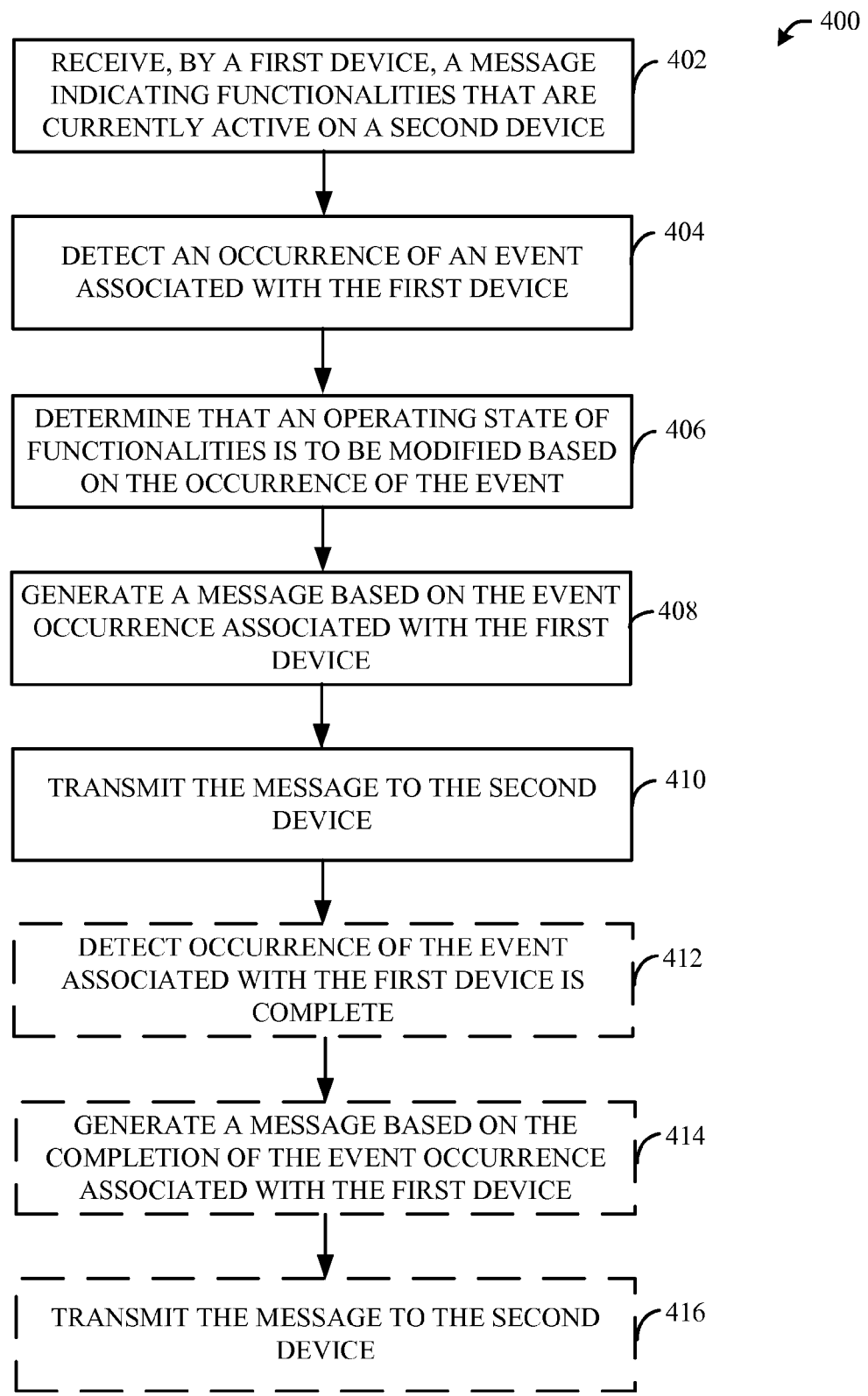
FIG. 4 depicts a flowchart describing another example system in which multiple device may collaboratively interact, according to an aspect.

FIGS. 2-4 illustrate various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 2 depicts an example call-flow diagram for interactions between multiple devices (202, 204) in a communications network 200 (e.g., peer network).

In an optional aspect, at act 206, devices (202, 204) may be connected to a peer network. In an aspect, each device may provide a unique identifier during the connection process. In another aspect, each device may also include a user identifier during the connection process. In another aspect, communications between devices (202, 204) may be performed using direct per-to-peer communications, communications through a network entity (e.g., WiFi router), cellular based communications, etc.

At act 208, a first device 202 may broadcast a message indicates one or more application in use on the first device. Similarly, a second device 204 may periodically listens to receive a message indicating what another device is doing. For example, when the first device 202 is currently running an application to stream video, then it may broadcast a message to the peer network indicating such current usage.

At act 210, an event may occur associated with the second device 204. In an aspect, the event occurrence may include reception and/or initiation of a functionality, a call, a bandwidth intensive activity, etc., attempting to send an urgent message, etc. In response to the event occurrence, the second device 204 may determine any other devices (e.g., 202) associated with the peer network are currently actively using an application that's usage may be modified in response to the event occurrence. In such an aspect, the type of event occurrence may affect which applications are determined to be potentially modified.

At act 212, the second device 204 may transmit a message to the first device 202 indicating the occurrence of the event. In an aspect, the message may include at least one of information indicating occurrence of the event, or information prompting the first device to modifying one or more functionalities based on the occurrence of the event.

At act 214, the first device 202 may change at least one of the one or more functionalities from a normal operating state to a modified operating state. In an aspect, the functionalities may include an application that is currently in use by a user, a user interface that is currently presenting information associated with the application, an auditory output mechanism that is currently used by the application, etc. In an aspect, changing the operating state may include ceasing operation of an application that is currently active on the first device, modifying bandwidth usage on the peer network, turning off a user interface on the first device, pausing presentation of content on the first device, etc.

At act 216, the event occurrence associated with the second device 204 may end. For example, the second device 204 may terminate an incoming call, may finish a bandwidth indicative activity, may have sent an urgent email, etc. In such an aspect, the second device 204 may generate a message which includes at least one of information indicating the occurrence of the event is complete, or information prompting the second device to return to the normal operating state from the modified operating state.

At act 218, the second device 204 may transmit the message to the first device 202.

At act 220, the first device 202 may receive the message from the second device, and change functionalities back from the modified operating state to the normal operating state.

FIG. 3 depicts a flowchart 300 describing an example system in which multiple devices may collaboratively interact, according to an aspect. In an aspect, a first device and a second device may be associated with a peer network.

In one optional aspect, at block 302, a communications device may detect other device associated with the peer network. In an aspect, the communication device may perform peer discovery to determine the presence of other devices. In another aspect, the communications device may receive a message including information on with other devices associated with the peer network.

In such an optional aspect, at block 304, the communications device may transmit a message indicating which of the one or more functionalities is currently active on the first device. In an aspect, the communications device may transmit the message on a periodic basis. In another aspect, the communications device may broadcast the message to allow any other devices in the peer network to receive the information. In still another aspect, the communications device may transmit the message to each device detected to be part of the peer network.

At block 306, the communications device may receive a message from a second device. In an aspect, the message from the second device may include at least one of information indicating an occurrence of an event associated with the second device, or information prompting the first device to modifying one or more functionalities based on the occurrence of the event. In another aspect, the communications device may receive messages, content, data, etc., using a direct peer communications link, a WLAN based link, a cellular based network, etc., or any combination thereof. In an aspect, the occurrence of the event may include reception and/or initiation of a functionality, a call, a notification, a request, a bandwidth intensive activity, etc., or any combination thereof, by the second device. In an aspect, the one or more functionalities may include an application that is currently in use by a user, a user interface that is currently presenting information associated with the application, an auditory output mechanism that is currently used by the application, etc.

At block 308, the communications device may change at least one functionality from a normal operating state to a modified operating state. In an aspect, the functionality may include an application that is currently in use by a user, a user interface that is currently presenting information associated with the application, an auditory output mechanism that is currently used by the application, etc. In an aspect, the communications device may change an operating state by ceasing operation of an application that is currently active on the device, modifying bandwidth usage on the peer network, turning off a user interface on the first device, pausing presentation of content on the device, etc.

In an optional aspect, at block 310, the communications device may receive another message from the second device. In an aspect, the second message may include information indicating that the occurrence of the event is complete and prompting the first device.

Further, in such an optional aspect, at block 312, the communications device may change the functionality back from the modified operating state to the normal operating state.

FIG. 4 depicts a flowchart 400 describing an example system in which multiple devices may collaboratively interact, according to an aspect. In an aspect, a first device and a second device may be associated with a peer network.

At block 402, a communications device may receive a message indicating which of the one or more functionalities is currently active on a second device. In an aspect, the communications device may receive the message on a periodic basis. In another aspect, the communications device may receive the message from a message broadcast by the second device. In an aspect, the message may be received on a periodic basis.

At block 404, a communications device may detect an occurrence of an event associated with the first device. In an aspect, the occurrence of the event may include reception and/or initiation of functionality, a call, a notification, a request, a bandwidth intensive activity, etc., or any combination thereof.

At block 406, a communications device may determine, based on the first message, that an operating state of at least one of the one or more functionalities on the second device may be modified based on the occurrence of the event. In an aspect, the functionality may include an application that is currently in use by a user on the second device, a user interface that is currently presenting information associated with the application, an auditory output mechanism that is currently used by the application, etc.

At block 408, a communications device may generate a message for the second device. In an aspect, the message may include information indicating the occurrence of the event associated with the first device. In another aspect, the message may include information prompting the second device to change at least one of the one or more functionalities from a normal operating state to a modified operating state based on the occurrence of the event.

At block 410, a communications device may transmit the second message to the second device. In another aspect, the communications device may transmit the message using a direct peer communications link, a WLAN based link, a cellular based network, etc., or any combination thereof.

In an optional aspect, at block 412, the communications device may detect that the occurrence of the event is complete.

Further, in such an optional aspect, at block 414, the communications device may generate another message for the second device. In such an aspect, the message may include information indicating the occurrence of the event is complete. In another aspect, the message may include information prompting the second device to return to the normal operating state from the modified operating state.

Still further, in such an optional aspect, at block 416, the communications device may transmit the message to the second device.

Figure 5:
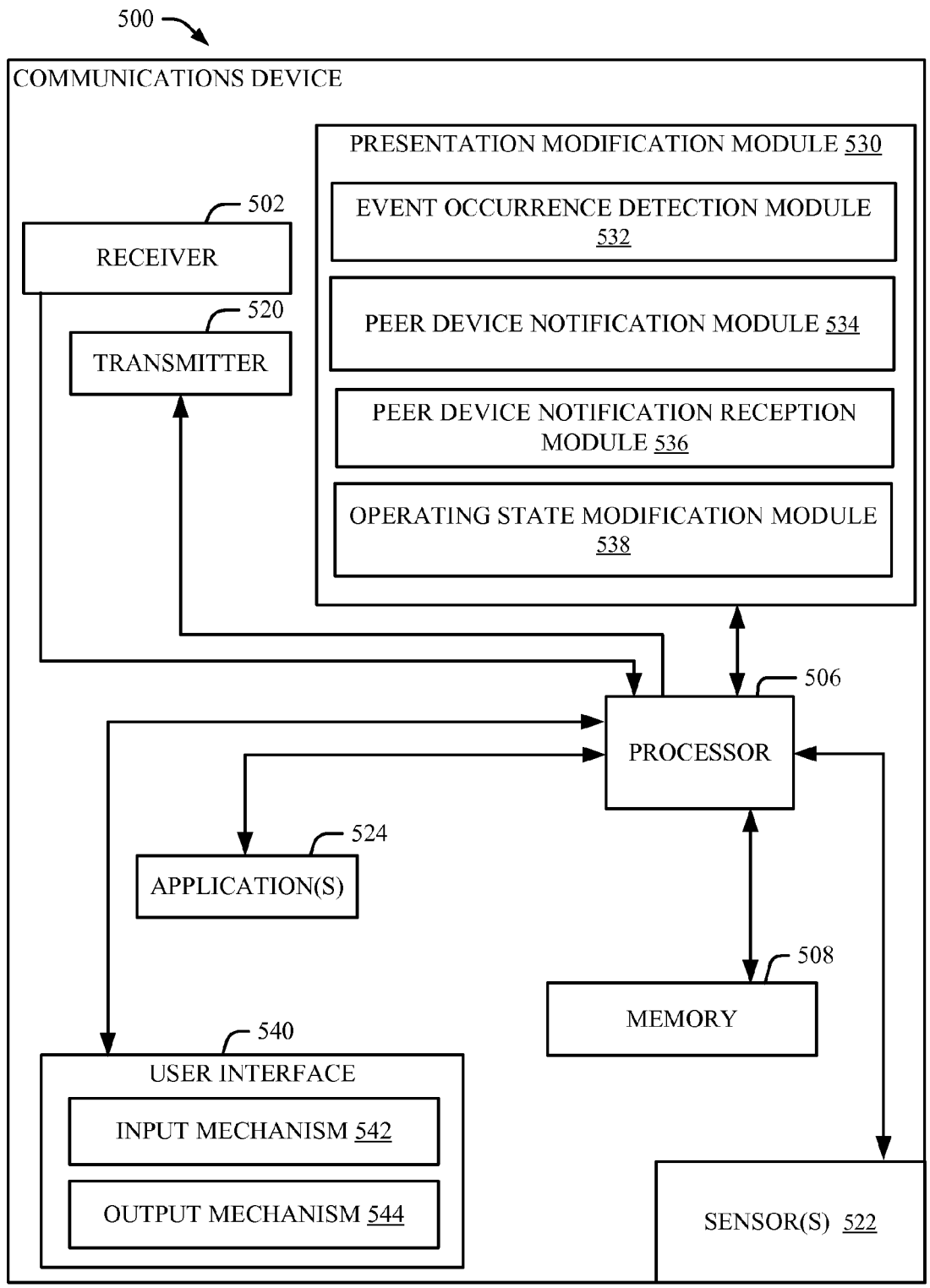
FIG. 5 depicts a block diagram of an example communications device for providing for an enhanced user experience through use enabling multiple devices to collaboratively interact, according to an aspect.

FIG. 5 depicts a block diagram of an example communications device 500 for providing for an enhanced user experience through enabling collaborative interactions among devices, according to an aspect. Communications device 500 comprises receiver 502 that receives one or more signals from, for instance, one or more receive antennas (not shown), performs typical actions on (e.g., filters, amplifies, downconverts, etc.) the received signals, and digitizes the conditioned signals to obtain samples. Receiver 502 can further comprise an oscillator that can provide a carrier frequency for demodulation of the received signal and a demodulator that can demodulate received symbols and provide them to processor 506 for channel estimation. In one aspect, communications device 500 may further comprise one or more secondary receivers and may receive additional channels of information.

Processor 506 can be a processor dedicated to analyzing information received by receiver 502 and/or generating information for transmission by one or more transmitters 520 (for ease of illustration, one transmitter is shown), a processor that controls one or more components of communications device 500, and/or a processor that both analyzes information received by receiver 502, generates information for transmission by transmitter 520 for transmission on one or more transmitting antennas (not shown), and controls one or more components of communications device 500.

In one aspect, processor 506 and/or presentation modification module 530 may provide means for receiving, by a first device, a first message from a second device, and means for changing at least one of the one or more functionalities from a normal operating state to a modified operating state. In an aspect, the first message may include at least one of information indicating an occurrence of an event associated with the second device, or information prompting the first device to modifying one or more functionalities based on the occurrence of the event. In another aspect, the first device and second device are associated with a peer network. In another aspect, processor 506 and/or presentation modification module 530 may provide means for receiving, by a first device, a first message from a second device, means for detecting an occurrence of an event associated with the first device, means for determining, based on the first message, that an operating state of at least one of the one or more functionalities is to be modified based on the occurrence of the event, means for generating a second message which includes at least one of information indicating an occurrence of an event associated with the first device, or information prompting the second device to change at least one of the one or more functionalities from a normal operating state to a modified operating state based on the occurrence of the event, and means for transmitting the second message to the second device. In such an aspect, the first message may include information indicating one or more functionalities active on the second device.

Communications device 500 can additionally comprise memory 508 that is operatively coupled to processor 506 and that can store data to be transmitted, received data, information related to available channels, data associated with analyzed signal and/or interference strength, information related to an assigned channel, power, rate, or the like, and any other suitable information for estimating a channel and communicating via the channel. Memory 508 can additionally store protocols and/or algorithms associated with estimating and/or utilizing a channel (e.g., performance based, capacity based, etc.). In one aspect, memory 508 may include a UICC which may include various modules such as but not limited to, a subscriber information module (SIM), a CDMA Subscriber Identity Module (CSIM), etc.

It will be appreciated that the data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods is intended to comprise, without being limited to, these and any other suitable types of memory.

Communications device 500 may further include presentation modification module 530 one or more functionalities such as sensor(s) 522, and one or more applications 524. In an aspect, presentation modification module 530 may include an event occurrence detection module 532, a peer device notification module 534, a peer device notification reception module 536, and/or operating state modification module 538. Event occurrence detection module 532 may be configured to detect an event occurrence associated with communications device 500. In an aspect, the occurrence of the event may include reception and/or initiation of functionality, a call, a notification, a request, a bandwidth intensive activity, etc., or any combination thereof. For example, communications device 500 may receive a call through a cellular communication system. In another aspect, communications device 500 may attempt to download content that uses a large portion of bandwidth available through a WLAN entity. Peer device notification module 534 may be configured to determine whether any other devices and/or functionalities active on any of the other devices may be affected by occurrence of the event associated with another device. Further, Peer device notification module 534 may communicate a message based on the vent occurrence to any potentially affected wireless devices. Peer device notification reception module 536 may be configured to receive messages indicating occurrence and/or completion of an event associated with another device. Operating state modification module 538 may be configured to modify presentation, usage, display, etc., of one or more functionalities associated with the communications device 500 based on reception of the message indicating the event occurrence and/or completion. In an aspect, operating state modification module 538 may be configured to switch between a modified operational mode and a normal operational mode based at least in part on whether an event has occurred and/or the event occurrence has completed.

Operation of presentation modification module 530 is depicted in the flowcharts of FIGS. 3 and 4.

Application 524 may assist communications device in performing specific tasks. In an optional aspect, application 524 may provide a user with access to content associated with communications device 500 (e.g., stored in memory 508, received through receiver 502, etc.). For example, applications 524 may be used to allow a user to perform a VoIP call, stream video content, communication content, etc.

Additionally, communications device 500 may include user interface 540. User interface 540 may include input mechanisms 542 for generating inputs into communications device 500, and output mechanism 544 for generating information for consumption by the user of communications device 500. For example, input mechanisms 542 may include a mechanism such as a key or keyboard, a mouse, a touch-screen display, a microphone, etc. Further, for example, output mechanism 544 may include a display, an audio speaker, a haptic feedback mechanism, a Personal Area Network (PAN) transceiver, etc. In one aspect, output mechanism 544 may include a display operable to present content that is in image or video format or an audio speaker to present content that is in an audio format. In one aspect, presentation modification module 530 may modify presentation/playback of content provided through output mechanism 544 when occurrence of an event is detected on a collaboratively connected peer device.

Figure 6:
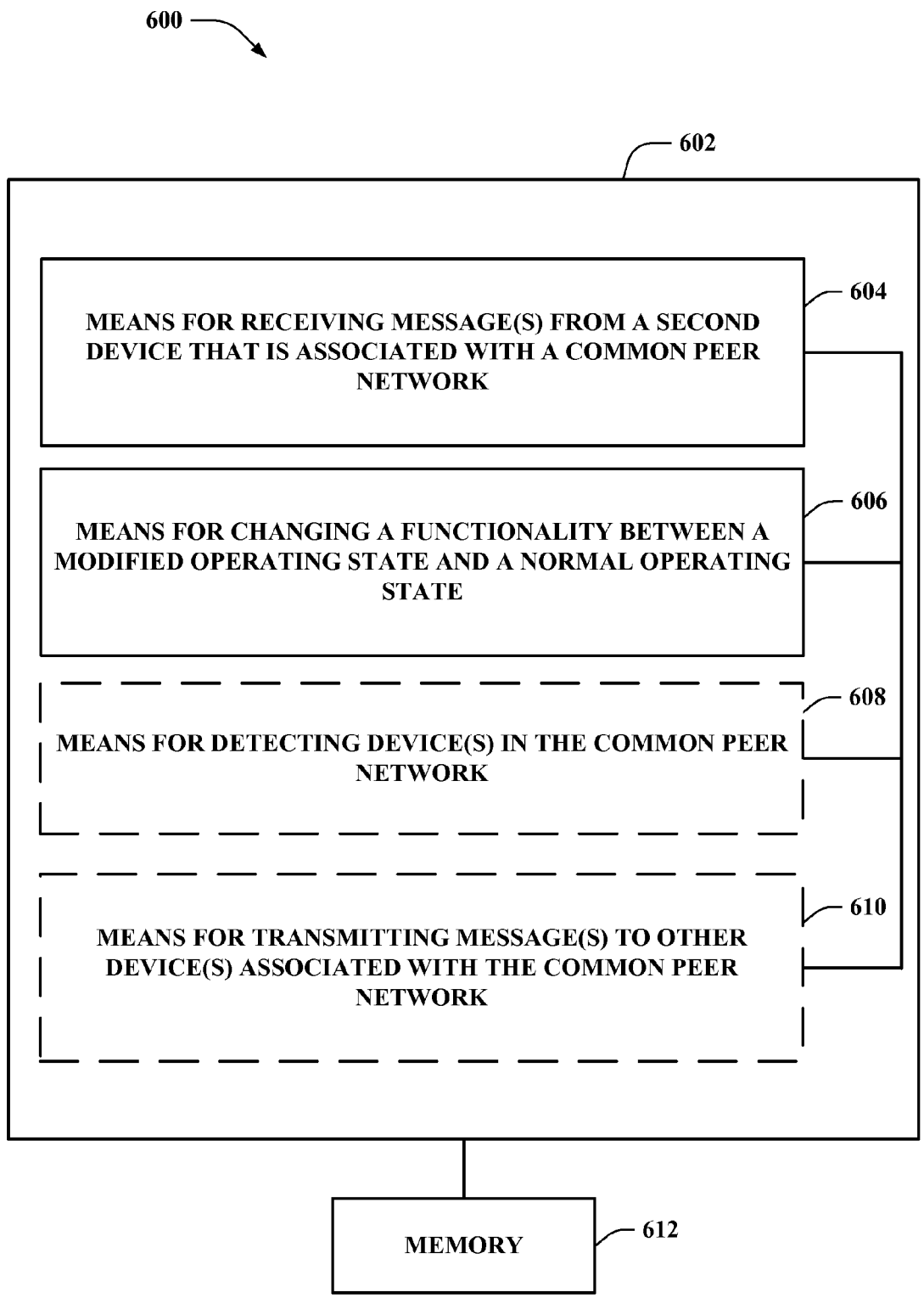
FIG. 6 depicts a block diagram of an example communication system that enables multiple devices to collaboratively interact, according to an aspect.

FIG. 6 depicts a block diagram of an exemplary communication system 600 operable to provide an improved user experience through enabling collaborative interactions among devices, according to an aspect. For example, system 600 can reside at least partially within a communications device (e.g., communications device 500). It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction.

For instance, logical grouping 602 can include an electrical component that may provide means for receiving 604 messages from a second device that is associated with a common peer network. For example, in an aspect, the means for receiving 604 can include receiver 502, presentation modification module 530, and/or processor 506 of communications device 500. In an aspect, the means for receiving 604 may be configured to receive a message which includes information indicating an occurrence of an event associated with the first device. In another aspect, the means for receiving 604 may be configured to receive a message which includes information prompting the device to change a functionality from a normal operating state to a modified operating state. In another aspect, the means for receiving 604 may be configured to receive a message which includes information indicating the occurrence of the event is complete. In another aspect, the means for receiving 604 may be configured to receive a message which includes information prompting the device to return to the normal operating state from the modified operating state. In another aspect, the means for receiving 604 may be configured to receive messages, content, data, etc., using a direct peer communications link, a WLAN based link, a cellular based network, etc., or any combination thereof. In an aspect, the occurrence of the event may include reception and/or initiation of a functionality, a call, a notification, a request, a bandwidth intensive activity, etc., or any combination thereof, by the second device. In an aspect, the one or more functionalities may include an application that is currently in use by a user, a user interface that is currently presenting information associated with the application, an auditory output mechanism that is currently used by the application, etc.

Further, logical grouping 602 can include an electrical component that may provide means for changing 606 a functionality between a modified operating state and a normal operating state. For example, in an aspect, the means for changing 606 can include presentation modification module 530, user interface 540, and/or processor 506 of communications device 500. In an aspect, means for changing 606 may be configured to cease operation of an application that is currently active on the device, modify bandwidth usage on the peer network, turn off a user interface on the first device, pause presentation of content on the device, etc.

Further, in an optional aspect, logical grouping 602 can include an electrical component that may provide means for detecting 608 peer device(s) in the common peer network. For example, in an aspect, the means for detecting 608 can include receiver 502, presentation modification module 530, and/or processor 506 of communications device 500.

Moreover, in another optional aspect, logical grouping 602 can include an electrical component that may provide means for transmitting 610 message(s) to other device(s) associated with the common peer network. For example, in an aspect, the means for transmitting 610 can include transmitter 520, presentation modification module 530, and/or processor 506 of communications device 500. In an aspect, the means for transmitting 610 may be configured to transmit a message indicating currently used functionalities on a periodic basis.

Additionally, system 600 can include a memory 612 that retains instructions for executing functions associated with the electrical components 604, 606, 608, and 610, and stores data used or obtained by the electrical components 604, 606, 608, 610, etc. While shown as being external to memory 612, it is to be understood that one or more of the electrical components 604, 606, 608, and 610 may exist within memory 612. In one example, electrical components 604, 606, 608, and 610 can include at least one processor, or each electrical component 604, 606, 608, and 610 can be a corresponding module of at least one processor. Moreover, in an additional or alternative example, electrical components 604, 606, 608, and 610 may be a computer program product including a computer readable medium, where each electrical component 604, 606, 608, and 610 may be corresponding code.

Figure 7:
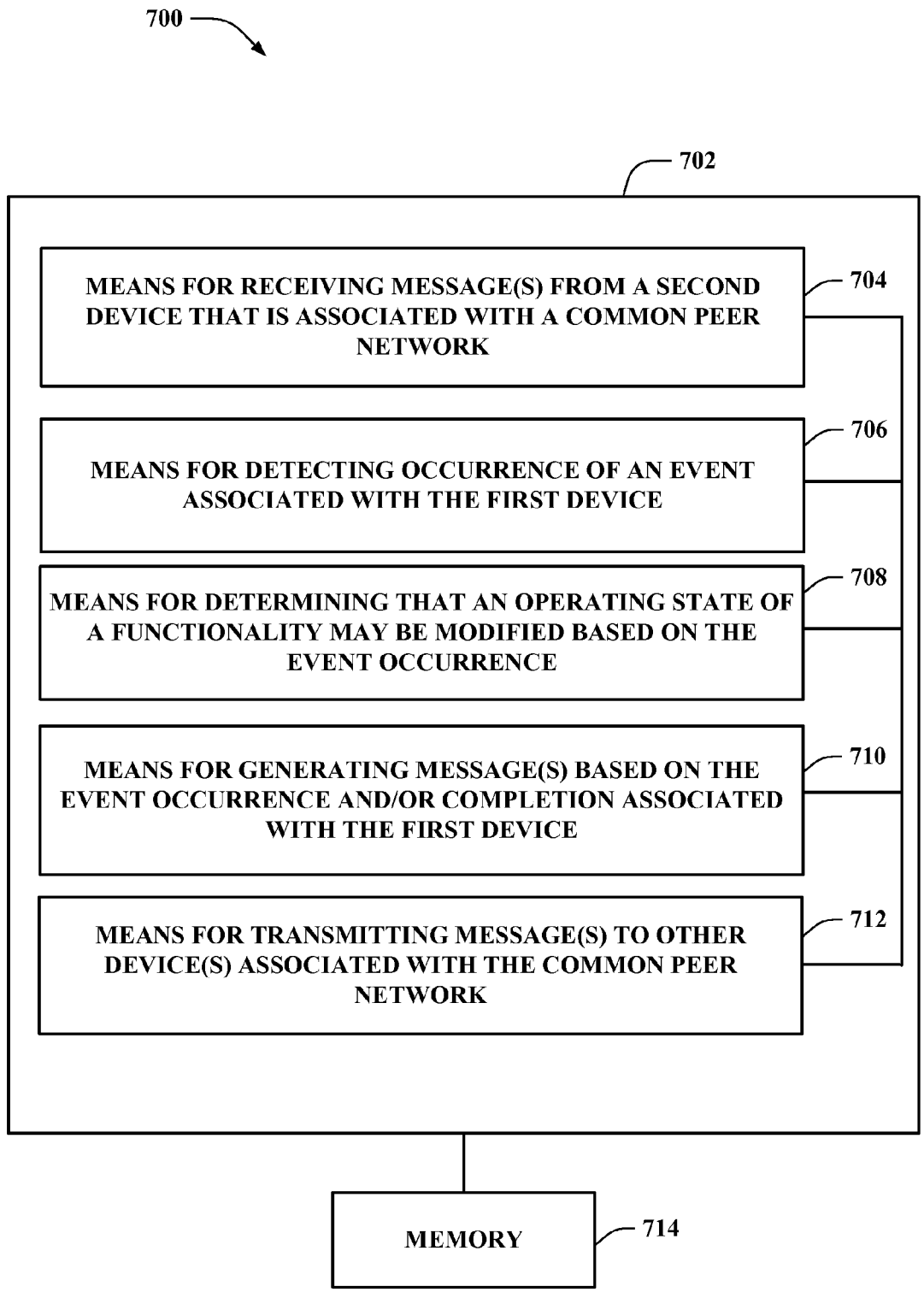
FIG. 7 depicts a block diagram of another example communication system that enables multiple devices to collaboratively interact, according to an aspect.

FIG. 7 depicts a block diagram of an exemplary communication system 700 operable to provide an improved user experience through enabling collaborative interactions among devices, according to an aspect. For example, system 700 can reside at least partially within a communications device (e.g., communications device 500). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction.

For instance, logical grouping 702 can include an electrical component that may provide means for receiving 704 messages from a second device that is associated with a common peer network. For example, in an aspect, the means for receiving 704 can include receiver 502, presentation modification module 530, and/or processor 506 of communications device 500. In an aspect, the means for receiving 704 may be configured to receive a first message from a second device that includes information indicating one or more functionalities that are active on the second device. In an aspect, the first device and second device may be associated with a common peer network. In another aspect, the message may be received on a periodic basis. In an aspect, the one or more functionalities may include an application that is currently in use by a user, a user interface that is currently presenting information associated with the application, an auditory output mechanism that is currently used by the application, etc. In another aspect, the means for receiving 704 may be configured to receive messages, content, data, etc., using a direct peer communications link, a WLAN based link, a cellular based network, etc., or any combination thereof.

Further, logical grouping 702 can include an electrical component that may provide means for detecting 706 occurrence of an event and/or completion of the event associated with the first device. For example, in an aspect, the means for detecting 706 can include receiver 502, sensor(s) 522, presentation modification module 530, user interface 540, and/or processor 506 of communications device 500. In an aspect, the occurrence of the event may include reception and/or initiation of a functionality, a call, a notification, a request, a bandwidth intensive activity, etc., or any combination thereof.

Further, logical grouping 702 can include an electrical component that may provide means for determining 708 that an operating state of a functionality associated with the second device may be modified based on the event occurrence.

For example, in an aspect, the means for determining 708 can include presentation modification module 530, and/or processor 506 of communications device 500.

Further, logical grouping 702 can include an electrical component that may provide means for generating 710 message(s) based on the event occurrence and/or completion of the event associated with the first device. For example, in an aspect, the means for generating 710 can include presentation modification module 530, and/or processor 506 of communications device 500. In an aspect, the means for generating 710 may be configured to generate a message which includes information indicating an occurrence of an event associated with the first device. In another aspect, the means for generating 710 may be configured to generate a message which includes information prompting the second device to change a functionality from a normal operating state to a modified operating state. In another aspect, the means for generating 710 may be configured to generate a message which includes information indicating the occurrence of the event is complete. In another aspect, the means for generating 710 may be configured to generate a message which includes information prompting the second device to return to the normal operating state from the modified operating state.

Moreover, logical grouping 702 can include an electrical component that may provide means for transmitting 712 message(s) to other device(s) associated with the common peer network. For example, in an aspect, the means for transmitting 712 can include transmitter 520, presentation modification module 530, and/or processor 506 of communications device 500. In another aspect, the means for transmitting 712 may be configured to transmit messages, content, data, etc., using a direct peer communications link, a WLAN based link, a cellular based network, etc., or any combination thereof.

Additionally, system 700 can include a memory 714 that retains instructions for executing functions associated with the electrical components 704, 706, 708, 710, and 712, and stores data used or obtained by the electrical components 704, 706, 708, 710, 712, etc. While shown as being external to memory 714, it is to be understood that one or more of the electrical components 704, 706, 708, 710, and 712 may exist within memory 714. In one example, electrical components 704, 706, 708, 710, and 712 can include at least one processor, or each electrical component 704, 706, 708, 710, and 712 can be a corresponding module of at least one processor. Moreover, in an additional or alternative example, electrical components 704, 706, 708, 710, and 712 may be a computer program product including a computer readable medium, where each electrical component 704, 706, 708, 710, and 712 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, TD-SCDMA and other systems. The terms "system" and "network" are often used interchangeably. A CDMA system may implement a radio technology such as UTRA, CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as GSM. An OFDMA system may implement a radio technology such as E-UTRA, Ultra Mobile Broadband (UMB), IEEE 802.11 (Wi-Fi), IEEE 802.16 (WiMAX), IEEE 802.20, Flash-OFDMT™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The word "exemplary" is used herein to mean serving as an example, instance, or illustration. Any aspect or design described herein as "exemplary" is not necessarily to be construed as preferred or advantageous over other aspects or designs. Additionally, as used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A method of communications, comprising:
   receiving, by a first user device, a first message from a second user device, wherein the first message includes at least one of information indicating an occurrence of an event associated with the second user device, or information prompting the first user device to modify one or more functionalities of the first user device based on the occurrence of the event associated with the second user device, and wherein the first user device and the second user device are associated with a peer network; and
   changing at least one of the one or more functionalities from a normal operating state to a modified operating state in response to receiving the first message.

2. The method of claim 1, further comprising:
   receiving a second message from the second user device, wherein the second message includes information indicating that the occurrence of the event is complete; and
   changing the at least one of the one or more functionalities back from the modified operating state to the normal operating state.

3. The method of claim 1, further comprising:
   detecting the second user device is associated with the peer network; and
   transmitting a third message indicating which of the one or more functionalities is currently active on the first user device.

4. The method of claim 3, wherein the third message is transmitted on a periodic basis.

5. The method of claim 1, wherein the occurrence of the event comprises at least one of:
   an indication that one or more functionalities associated with the second user device are now currently active on the second user device;
   reception of a call by the second user device;
   reception of a notification by the second user device;

reception of a bandwidth intensive activity by the second user device;
initiation of the call by the second user device;
initiation of the notification by the second user device;
initiation of the bandwidth intensive activity by the second user device; or
any combination thereof.

6. The method of claim 1, wherein the one or more functionalities comprise at least one of:
an application that is currently in use by a user;
a user interface that is currently presenting information associated with the application; or
an auditory output mechanism that is currently used by the application.

7. The method of claim 1, wherein changing at least one of the one or more functionalities from the normal operating state to the modified operating state comprises at least one of:
ceasing operation of an application that is currently active on the first user device;
modifying bandwidth usage on the peer network;
turning off a user interface on the first user device; or
pausing presentation of content on the first user device.

8. The method of claim 1, wherein the first message is received from the second user device using at least one of:
a direct peer communications link;
a wireless local area network (WLAN) based link;
a cellular based network; or
any combination thereof.

9. The method of claim 1, wherein the occurrence of the event comprises a reception or initiation of a call by the second user device.

10. A method of communications, comprising:
receiving, by a first device, a first message from a second device, wherein the first message includes information indicating one or more functionalities active on the second device, and wherein the first device and the second device are associated with a peer network;
detecting an occurrence of an event associated with the first device;
determining, based on the first message, that an operating state of at least one of the one or more functionalities is to be modified based on the occurrence of the event;
generating a second message which includes at least one of information indicating the occurrence of the event associated with the first device, or information prompting the second device to change at least one of the one or more functionalities from a normal operating state to a modified operating state based on the occurrence of the event; and
transmitting the second message to the second device.

11. The method of claim 10, further comprising:
detecting that the occurrence of the event is complete;
generating a third message which includes at least one of information indicating the occurrence of the event is complete, or information prompting the second device to return to the normal operating state from the modified operating state; and
transmitting the third message to the second device.

12. The method of claim 10, wherein the first message is received on a periodic basis.

13. The method of claim 10, wherein the occurrence of the event comprises at least one of:
an indication that one or more functionalities associated with the first device are now currently active on the first device;
reception of a call by the first device;
reception of a notification by the first device;
reception of a bandwidth intensive activity by the first device;
initiation of the call by the first device;
initiation of the notification by the first device;
initiation of the bandwidth intensive activity by the first device; or any combination thereof.

14. The method of claim 10, wherein the one or more functionalities comprise at least one of:
an application that is currently in use by a user;
a user interface that is currently presenting information associated with the application; or
an auditory output mechanism that is currently used by the application.

15. The method of claim 10, wherein the first message is received from the second device using at least one of:
a direct peer communications link;
a wireless local area network (WLAN) based link;
a cellular based network; or any combination thereof.

16. An apparatus for communications, comprising:
means for receiving, by a first user device, a first message from a second user device, wherein the first message includes at least one of information indicating an occurrence of an event associated with the second user device, or information prompting the first user device to modify one or more functionalities of the first user device based on the occurrence of the event associated with the second user device, and wherein the first user device and the second user device are associated with a peer network; and
means for changing at least one of the one or more functionalities from a normal operating state to a modified operating state in response to reception of the first message.

17. The apparatus of claim 16, wherein the means for receiving comprises means for receiving a second message from the second user device, wherein the second message includes information indicating that the occurrence of the event is complete; and
wherein the means for changing comprises means for changing the at least one of the one or more functionalities back from the modified operating state to the normal operating state.

18. The apparatus of claim 16, further comprising:
means for detecting the second user device is associated with the peer network; and
means for transmitting a third message indicating which of the one or more functionalities is currently active on the first user device.

19. The apparatus of claim 18, wherein the means for transmitting comprises means for transmitting the third message on a periodic basis.

20. The apparatus of claim 16, wherein the occurrence of the event comprises at least one of:
an indication that one or more functionalities associated with the second user device are now currently active on the second user device;
reception of a call by the second user device;
reception of a notification by the second user device;
reception of a bandwidth intensive activity by the second user device;
initiation of the call by the second user device;
initiation of the notification by the second user device;
initiation of the bandwidth intensive activity by the second user device; or
any combination thereof.

21. The apparatus of claim 16, wherein the one or more functionalities comprise at least one of:
- an application that is currently in use by a user;
- a user interface that is currently presenting information associated with the application; or
- an auditory output mechanism that is currently used by the application.

22. The apparatus of claim 16, wherein the means for changing comprises at least one of:
- means for ceasing operation of an application that is currently active on the first user device;
- means for modifying bandwidth usage on the peer network;
- means for turning off a user interface on the first user device; or
- means for pausing presentation of content on the first user device.

23. The apparatus of claim 16, wherein the means for receiving comprises means for receiving the first message from the second user device using at least one of:
- a direct peer communications link;
- a wireless local area network (WLAN) based link;
- a cellular based network; or any combination thereof.

24. An apparatus for communications, comprising:
- means for receiving, by a first device, a first message from a second device, wherein the first message includes information indicating one or more functionalities active on the second device, and wherein the first device and the second device are associated with a peer network;
- means for detecting an occurrence of an event associated with the first device;
- means for determining, based on the first message, that an operating state of at least one of the one or more functionalities is to be modified based on the occurrence of the event;
- means for generating a second message which includes at least one of information indicating the occurrence of the event associated with the first device, or information prompting the second device to change at least one of the one or more functionalities from a normal operating state to a modified operating state based on the occurrence of the event; and
- means for transmitting the second message to the second device.

25. The apparatus of claim 24, wherein the means for detecting comprises means for detecting that the occurrence of the event is complete;
- wherein the means for generating comprises means for generating a third message which includes at least one of information indicating the occurrence of the event is complete, or information prompting the second device to return to the normal operating state from the modified operating state; and
- wherein the means for transmitting comprises means for transmitting the third message to the second device.

26. The apparatus of claim 24, wherein the means for receiving comprises means for receiving the first message on a periodic basis.

27. The apparatus of claim 24, wherein the occurrence of the event comprises at least one of:
- reception of a call by the first device;
- an indication that one or more functionalities associated with the first device are now currently active on the first device;
- reception of a notification by the first device;
- reception of a bandwidth intensive activity by the first device;
- initiation of the call by the first device;
- initiation of the notification by the first device;
- initiation of the bandwidth intensive activity by the first device; or any combination thereof.

28. The apparatus of claim 24, wherein the one or more functionalities comprise at least one of:
- an application that is currently in use by a user;
- a user interface that is currently presenting information associated with the application; or
- an auditory output mechanism that is currently used by the application.

29. The apparatus of claim 24, wherein the means for receiving comprises means for receiving the first message from the second device using at least one of:
- a direct peer communications link;
- a wireless local area network (WLAN) based link;
- a cellular based network; or any combination thereof.

30. A non-transitory computer-readable medium comprising:
- at least one instruction for causing a computer to receive, by a first user device, a first message from a second user device, wherein the first message includes at least one of information indicating an occurrence of an event associated with the second user device, or information prompting the first user device to modify one or more functionalities of the first user device based on the occurrence of the event associated with the second user device, and wherein the first user device and the second user device are associated with a peer network; and
- at least one instruction for causing the computer to change at least one of the one or more functionalities from a normal operating state to a modified operating state in response to reception of the first message.

31. The non-transitory computer-readable medium of claim 30, further comprising:
- at least one instruction for causing the computer to receive a second message from the second user device, wherein the second message includes information indicating that the occurrence of the event is complete; and
- at least one instruction for causing the computer to change the at least one of the one or more functionalities back from the modified operating state to the normal operating state.

32. The non-transitory computer-readable medium of claim 30, further comprising:
- at least one instruction for causing the computer to detect the second user device is associated with the peer network; and
- at least one instruction for causing the computer to transmit a third message indicating which of the one or more functionalities is currently active on the first user device.

33. The non-transitory computer-readable medium of claim 32, wherein the at least one instruction for causing the computer to transmit the third message comprises at least one instruction for causing the computer to transmit the third message on a periodic basis.

34. The non-transitory computer-readable medium of claim 30, wherein the occurrence of the event comprises at least one of:
- an indication that one or more functionalities associated with the second user device are now currently active on the second user device;
- reception of a call by the second user device;
- reception of a notification by the second user device;

reception of a bandwidth intensive activity by the second user device;
initiation of the call by the second user device;
initiation of the notification by the second user device;
initiation of the bandwidth intensive activity by the second user device; or
any combination thereof.

35. The non-transitory computer-readable medium of claim 30, wherein the one or more functionalities comprise at least one of:
an application that is currently in use by a user;
a user interface that is currently presenting information associated with the application; or
an auditory output mechanism that is currently used by the application.

36. The non-transitory computer-readable medium of claim 30, further comprising at least one instruction for causing the computer to perform at least one of:
ceasing operation of an application that is currently active on the first user device;
modifying bandwidth usage on the peer network;
turning off a user interface on the first user device; or
pausing presentation of content on the first user device.

37. The non-transitory computer-readable medium of claim 30, wherein the at least one instruction for causing the computer to receive the second message comprises at least one instruction for causing the computer to receive the first message from the second user device using at least one of:
a direct peer communications link;
a wireless local area network (WLAN) based link;
a cellular based network; or any combination thereof.

38. A non-transitory computer-readable medium comprising:
at least one instruction for causing a computer to receive, by a first device, a first message from a second device, wherein the first message includes information indicating one or more functionalities active on the second device, and wherein the first device and the second device are associated with a peer network;
at least one instruction for causing the computer to detect an occurrence of an event associated with the first device;
at least one instruction for causing the computer to determine, based on the first message, that an operating state of at least one of the one or more functionalities is to be modified based on the occurrence of the event;
at least one instruction for causing the computer to generate a second message which includes at least one of information indicating the occurrence of the event associated with the first device, or information prompting the second device to change at least one of the one or more functionalities from a normal operating state to a modified operating state based on the occurrence of the event; and
at least one instruction for causing the computer to transmit the second message to the second device.

39. The non-transitory computer-readable medium of claim 38, further comprising:
at least one instruction for causing the computer to detect that the occurrence of the event is complete;
at least one instruction for causing the computer to generate a third message which includes at least one of information indicating the occurrence of the event is complete, or information prompting the second device to return to the normal operating state from the modified operating state; and
at least one instruction for causing the computer to transmit the third message to the second device.

40. The non-transitory computer-readable medium of claim 38, wherein the at least one instruction for causing the computer to receive the first message comprises at least one instruction for causing the computer to receive the first message on a periodic basis.

41. The non-transitory computer-readable medium of claim 38, wherein the occurrence of the event comprises at least one of:
an indication that one or more functionalities associated with the first device are now currently active on the first device;
reception of a call by the first device;
reception of a notification by the first device;
reception of a bandwidth intensive activity by the first device;
initiation of the call by the first device;
initiation of the notification by the first device;
initiation of the bandwidth intensive activity by the first device; or any combination thereof.

42. The non-transitory computer-readable medium of claim 38, wherein the one or more functionalities comprise at least one of:
an application that is currently in use by a user;
a user interface that is currently presenting information associated with the application; or
an auditory output mechanism that is currently used by the application.

43. The non-transitory computer-readable medium of claim 38, wherein the at least one instruction for causing the computer to receive the first message comprises at least one instruction for causing the computer to receive the first message from the second device using at least one of:
a direct peer communications link;
a wireless local area network (WLAN) based link;
a cellular based network; or any combination thereof.

44. An apparatus for communications, comprising:
a processing system configured to:
receive, by a first user device, a first message from a second user device, wherein the first message includes at least one of information indicating an occurrence of an event associated with the second user device, or information prompting the first user device to modify one or more functionalities of the first user device based on the occurrence of the event associated with the second user device, and wherein the first user device and the second user device are associated with a peer network; and
change at least one of the one or more functionalities from a normal operating state to a modified operating state in response to reception of the first message.

45. The apparatus of claim 44, wherein the processing system is further configured to:
receive a second message from the second user device, wherein the second message includes information indicating that the occurrence of the event is complete; and
change the at least one of the one or more functionalities back from the modified operating state to the normal operating state.

46. The apparatus of claim 44, wherein the processing system is further configured to:
detect the second user device is associated with the peer network; and
transmit a third message indicating which of the one or more functionalities is currently active on the first user device.

47. The apparatus of claim 46, wherein the processing system is configured to transmit the third message on a periodic basis.

48. The apparatus of claim 44, wherein the occurrence of the event comprises at least one of:
- an indication that one or more functionalities associated with the second user device are now currently active on the second user device;
- reception of a call by the second user device;
- reception of a notification by the second user device;
- reception of a bandwidth intensive activity by the second user device;
- initiation of the call by the second user device;
- initiation of the notification by the second user device;
- initiation of the bandwidth intensive activity by the second user device; or
- any combination thereof.

49. The apparatus of claim 44, wherein the one or more functionalities comprise at least one of:
- an application that is currently in use by a user;
- a user interface that is currently presenting information associated with the application; or
- an auditory output mechanism that is currently used by the application.

50. The apparatus of claim 44, wherein the processing system is further configured to perform at least one of:
- ceasing operation of an application that is currently active on the first user device;
- modifying bandwidth usage on the peer network;
- turning off a user interface on the first user device; or
- pausing presentation of content on the first user device.

51. The apparatus of claim 44, wherein the processing system is configured to receive the first message from the second user device using at least one of:
- a direct peer communications link;
- a wireless local area network (WLAN) based link;
- a cellular based network; or
- any combination thereof.

52. An apparatus for communications, comprising:
a processing system configured to:
- receive, by a first device, a first message from a second device, wherein the first message includes information indicating one or more functionalities active on the second device, and wherein the first device and the second device are associated with a peer network;
- detect an occurrence of an event associated with the first device;
- determine, based on the first message, that an operating state of at least one of the one or more functionalities is to be modified based on the occurrence of the event;
- generate a second message which includes at least one of information indicating the occurrence of the event associated with the first device, or information prompting the second device to change at least one of the one or more functionalities from a normal operating state to a modified operating state based on the occurrence of the event; and
- transmit the second message to the second device.

53. The apparatus of claim 52, wherein the processing system is further configured to:
- detect that the occurrence of the event is complete;
- generate a third message which includes at least one of information indicating the occurrence of the event is complete, or information prompting the second device to return to the normal operating state from the modified operating state; and
- transmit the third message to the second device.

54. The apparatus of claim 52, wherein the processing system is configured to receive the first message on a periodic basis.

55. The apparatus of claim 52, wherein the occurrence of the event comprises at least one of:
- reception of a call by the first device;
- an indication that one or more functionalities associated with the first device are now currently active on the first device;
- reception of a notification by the first device;
- reception of a bandwidth intensive activity by the first device;
- initiation of the call by the first device;
- initiation of the notification by the first device;
- initiation of the bandwidth intensive activity by the first device; or any combination thereof.

56. The apparatus of claim 52, wherein the one or more functionalities comprise at least one of:
- an application that is currently in use by a user;
- a user interface that is currently presenting information associated with the application; or
- an auditory output mechanism that is currently used by the application.

57. The apparatus of claim 52, wherein the processing system is configured to receive the first message from the second device using at least one of:
- a direct peer communications link;
- a wireless local area network (WLAN) based link;
- a cellular based network; or any combination thereof.

* * * * *